US008174846B2

(12) United States Patent
Hamada et al.

(10) Patent No.: US 8,174,846 B2
(45) Date of Patent: May 8, 2012

(54) ELECTRONIC DEVICE

(75) Inventors: Tomohiro Hamada, Tachikawa (JP);
Toshikazu Shiroishi, Hamura (JP);
Tomoko Kitamura, Ome (JP); Toshio Konno, Akiruno (JP); Kohei Wada, Tachikawa (JP); Ryosuke Saito, Koganei (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/878,888

(22) Filed: Sep. 9, 2010

(65) Prior Publication Data

US 2011/0149534 A1 Jun. 23, 2011

(30) Foreign Application Priority Data

Dec. 18, 2009 (JP) ................. 2009-288321

(51) Int. Cl.
*H05K 7/02* (2006.01)
*H05K 7/04* (2006.01)
(52) U.S. Cl. .............. 361/810; 361/807; 361/728
(58) Field of Classification Search .............. 361/600, 361/605, 614, 679.01, 728, 736, 800–803, 361/807, 810, 760
See application file for complete search history.

(56) References Cited

U.S. PATENT DOCUMENTS

| 4,560,844 | A  | * | 12/1985 | Takamura et al. | ............ 200/5 A |
| 5,438,418 | A  | * | 8/1995  | Fukui et al.    | ............ 356/399 |
| 7,164,577 | B2 | * | 1/2007  | Minaguchi et al.| ...... 361/679.33 |
| 7,499,284 | B2 | * | 3/2009  | Kawanobe et al. | ............ 361/752 |
| 7,643,282 | B2 | * | 1/2010  | Tanaka et al.   | ......... 361/679.37 |
| 7,719,824 | B2 | * | 5/2010  | Tanaka et al.   | ......... 361/679.01 |
| 7,990,695 | B2 | * | 8/2011  | Lv              | ............. 361/679.3 |
| 2009/0244820 | A1 |  | 10/2009 | Kusaka et al.   |                     |
| 2011/0122595 | A1 | * | 5/2011 | Shiroishi et al.| ............ 361/818 |

FOREIGN PATENT DOCUMENTS

| JP | U 60-180026   | 11/1985 |
| JP | U 02-111022   | 9/1990  |
| JP | 06-275171 A   | 9/1994  |
| JP | 06-302978 A   | 10/1994 |
| JP | 2002-260486 A | 9/2002  |
| JP | 2002-312061 A | 10/2002 |
| JP | 2003-132758 A | 5/2003  |
| JP | 2007-173111 A | 7/2007  |
| JP | 2008-009904 A | 1/2008  |
| JP | 2009-238175 A | 10/2009 |
| JP | 2009-294944 A | 12/2009 |

OTHER PUBLICATIONS

Notice of Reasons for Rejection mailed by Japan Patent Office on Dec. 14, 2010 in the corresponding Japanese patent application No. 2009-288321.

* cited by examiner

*Primary Examiner* — Hung S Bui
(74) *Attorney, Agent, or Firm* — Knobbe, Martens, Olson & Bear LLP

(57) ABSTRACT

According to one embodiment, an electronic device includes a casing including a cover, an input portion provided on the cover and configured to receive an external input, a circuit board contained in the casing and including a switch configured to be operated by the input portion, a support member configured to permit the circuit board to be supported by the cover, and an engagement portion integral with the support member and configured to hold the circuit board in cooperation with the support member.

11 Claims, 5 Drawing Sheets

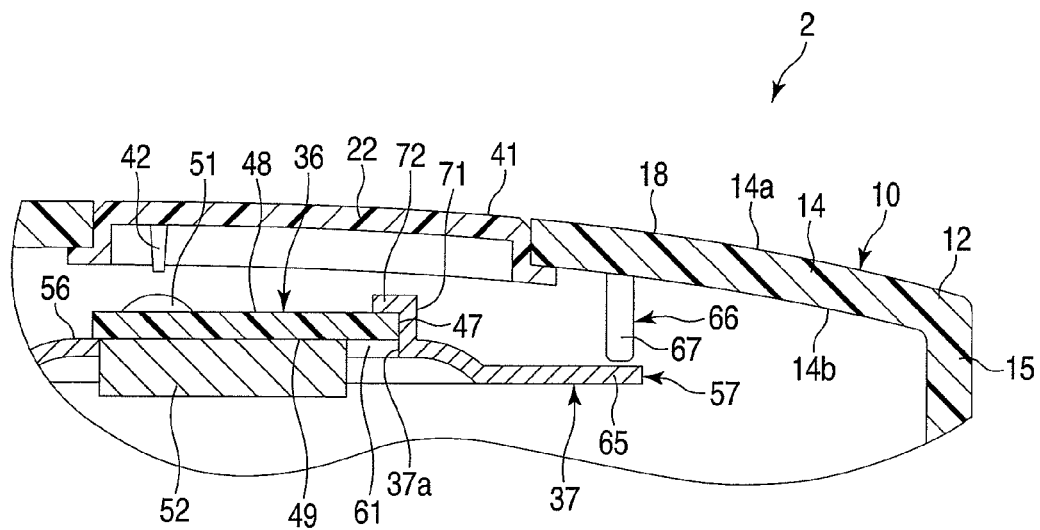
F I G. 3
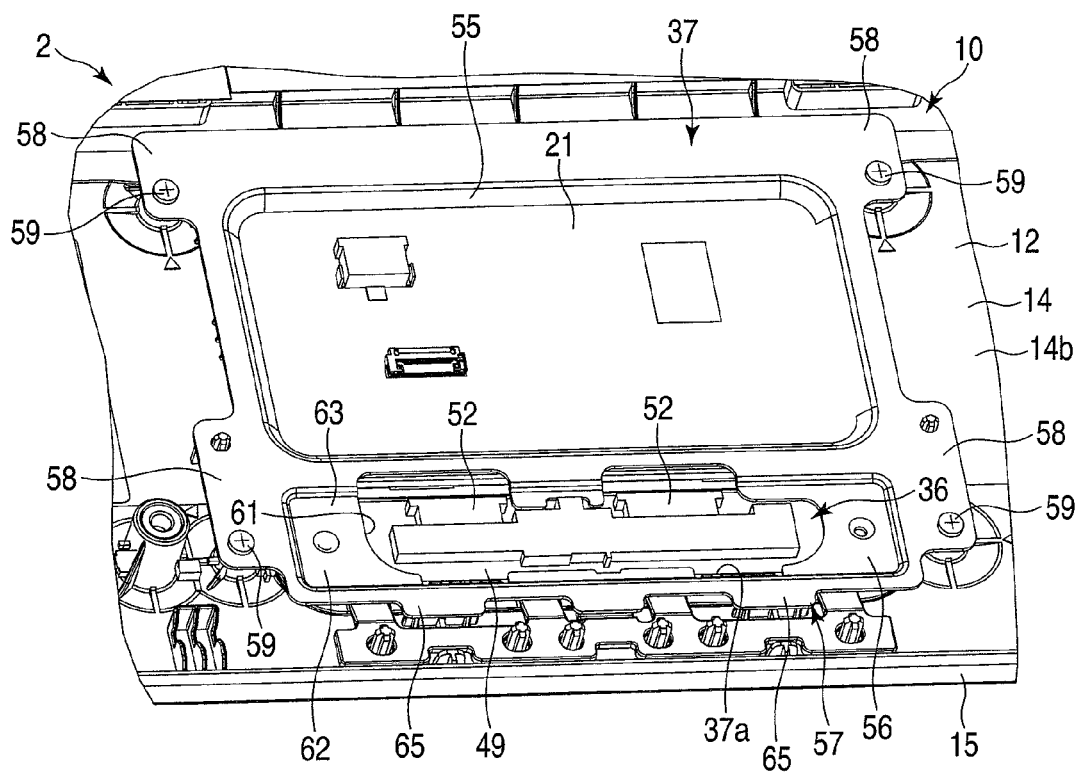
F I G. 4

ELECTRONIC DEVICE

CROSS-REFERENCE TO RELATED APPLICATIONS

This application is based upon and claims the benefit of priority from Japanese Patent Application No. 2009-288321, filed Dec. 18, 2009; the entire contents of which are incorporated herein by reference.

FIELD

Embodiments described herein relate generally to an electronic device comprising a support member configured to support a circuit board.

BACKGROUND

Electronic devices such as portable computers comprise various types of input device, including a keyboard, a touch-pad, and a button used for click operation. For example, the click-operation button includes an input portion exposed to the outside of a casing. When a user pushes this input portion, a switch on a circuit board is operated and closed.

The circuit board on which the switch is provided is attached to a support member such as a metallic plate. The circuit board is secured to the casing by fixing the support member to the casing. In the switch structure disclosed in Jpn. Pat. Appln. KOKAI Publication No. 2003-132758, a switch board is bolded from behind by a hold plate and is fixed to the wall of a cover by means of a screw.

With respect to the click-operation button, when a peripheral portion of the input portion of the casing is strongly depressed from the outside, the input portion fixed to the casing is also depressed. If the input portion is depressed, the switch may be undesirably operated and closed without the user depressing the switch.

Electronic devices such as portable computers have to be thin and light in weight for easy portability. In this type of electronic device, the distance between the input portion and the switch is short, and the switch is likely to be undesirably closed when the casing is depressed.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary longitudinal view showing the internal structure of the main casing of the portable computer depicted in FIG. 1.

FIG. 4 is an exemplary perspective view showing inside of the cover of the main casing of FIG. 1.

DETAILED DESCRIPTION

Various embodiments will be described hereinafter with reference to the accompanying drawings.

In general, according to one embodiment, an electronic device includes a casing including a cover, an input portion provided on the cover and configured to receive an external input, a circuit board contained in the casing and including a switch configured to be operated by the input portion, a support member configured to permit the circuit board to be supported by the cover, and an engagement portion integral with the support member and configured to hold the circuit board in cooperation with the support member.

One embodiment will now be described with reference to FIGS. 1 through 7. In this specification, the closer portion of the device (i.e., the side closer to the user) is defined as being located forward, and the distant portion of the device (i.e., the portion away from the user) is defined as being located rearward. Likewise, the leftward direction is the leftward direction as viewed from the user, the rightward direction is the rightward direction as viewed from the user, the upward direction is the upward direction as viewed from the user, and the downward direction is the downward direction as viewed from the user.

Figure 1:
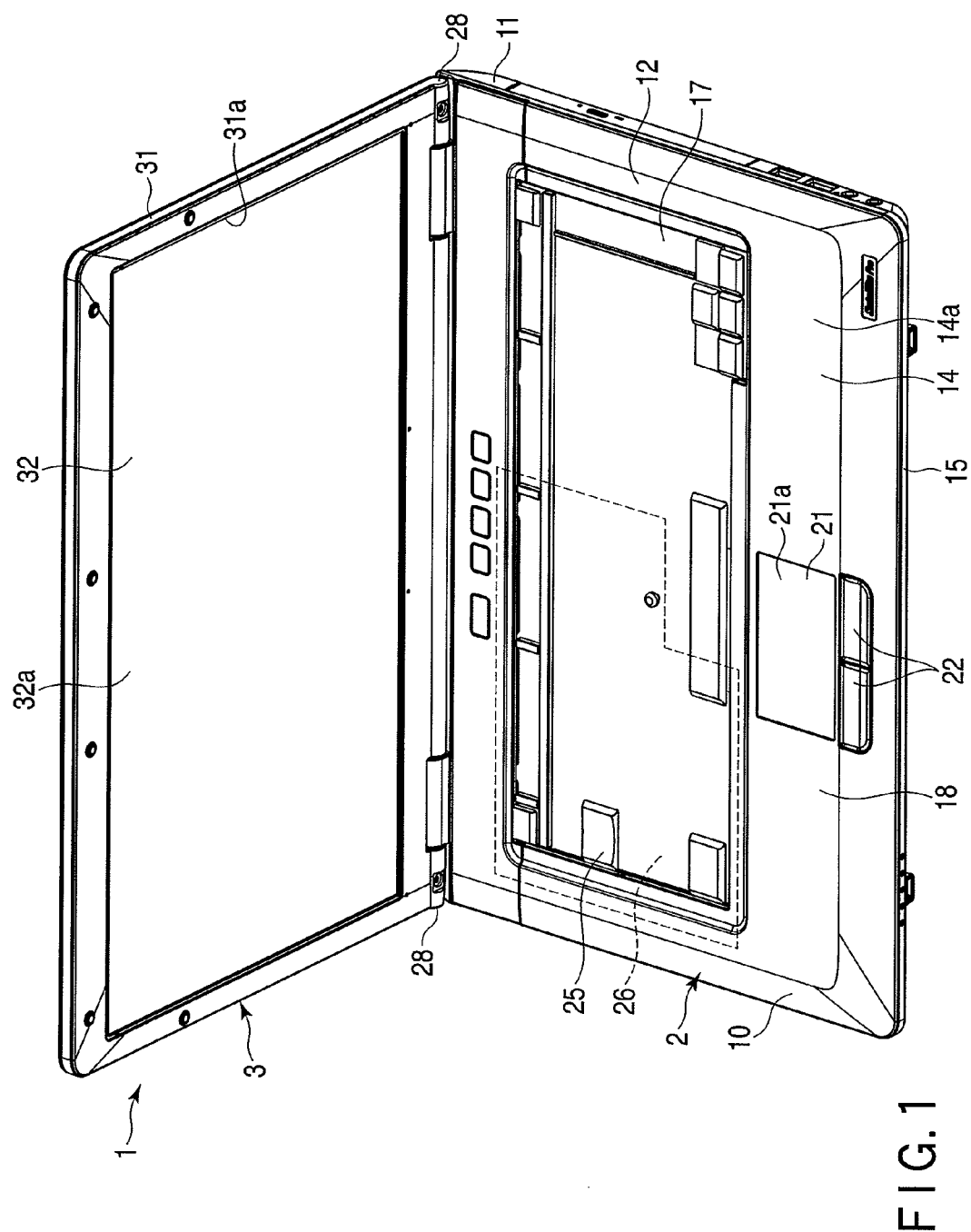
FIG. 1 is an exemplary perspective view of a portable computer according to one embodiment.

FIG. 1 shows a portable computer 1 in the state where the keys of a keyboard are partly emitted. The portable computer 1 is an example of an electronic device. As shown in FIG. 1, the portable computer 1 comprises a computer main body 2 and a display unit 3.

The computer main body 2 comprises a flat box-like main casing 10. The main casing 10 is an example of a casing. The main casing 10 includes a base 11 and a cover 12. The cover 12 is laid over the base 11 from above.

The cover 12 includes an upper wall 14 and a side wall 15. The side wall 15 is located at the forward end of the upper wall 14. The upper wall 14 includes an upper surface 14a. A keyboard attachment section 17, an arm rest 18, a touch pad 21 and a pair of buttons 22 are provided on the upper surface 14a of the upper wall 14. The buttons 22 are buttons for a click operation, and are an example of input portions.

The touch pad 21 comprises a sensing surface 21a exposed to the outside of the upper wall 14. The touch pad 21 is configured to sense an object moved on the sensing surface 21a. For example, the touch pad 21 senses a finger tip of the user moved on the sensing surface 21a.

The keyboard attachment section 17 is located in the rearward region of the upper surface 14a. The arm rest 18 is located in the forward region of the upper surface 14a. The touch pad 21 and the paired buttons 22 are located in the center of the arm rest 18.

A keyboard 25 is supported on the keyboard attachment section 17. A mother board 26 is provided inside the main casing 10. A variety of electronic components including a CPU are mounted on the mother board 26.

The display unit 3 is coupled to the rear end of the computer main body 2 by means of a pair of hinges 28. With the hinges 28 as support points, the display unit 3 is rotatable between a closed position and an open position. When rotated to the closed position, the display unit 3 is laid over the computer main body 2, with the hinges 28 as support points. When rotated to the open position, the display unit 3 stands on the rear end of the computer main body 2.

The display unit 3 comprises a flat box-like display casing 31 and a display module 32. The display module 32 is a liquid crystal display, for example. The display module 32 is provided inside the display casing 31. The display casing 31 is provided with a display opening section 31a formed in the front surface thereof. The display opening section 31a permits the screen 32a of the display module 32 to be exposed to the outside of the display unit 3.

Figure 2:
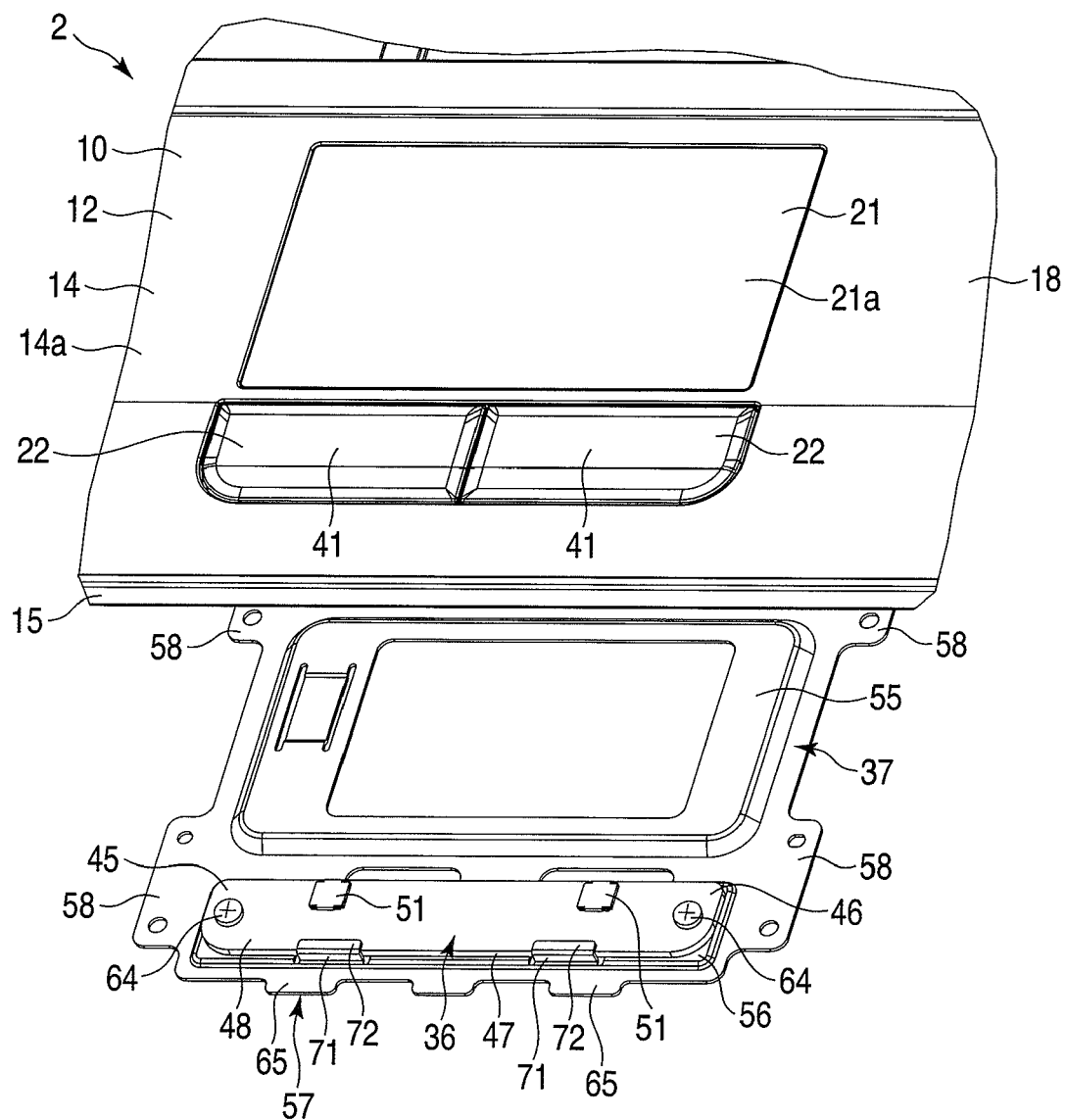
FIG. 2 is an exemplary perspective view showing the portable computer in an exploded state.

FIG. 2 is an exploded view of a number of components of the computer main body 2. As shown in FIG. 2, the computer main body 10 contains a switch board 36 and a support member 37. The switch board 36 is an example of a circuit board.

The buttons 22, the switch board 36 and the support member 37 will be described with reference to the drawings.

FIG. 3 shows how the internal structure of the main casing 10 is in the neighborhood of the buttons 22. As shown in FIG. 3, each of the buttons 22 comprises an exposed surface 41 and an operation portion 42. The exposed surface 41 is exposed to the outside of the upper wall 14. The operation portion 42 protrudes into the interior of the main casing 10.

Each of the buttons 22 is elastically movable relative to the arm rest 18 in such a manner that each button 22 is lowered toward the interior of the main casing 10. In other words, when each button 22 is applied with an external input, such as a force applied by a finger tip, it is moved downward into the interior of the main casing 10.

As shown in FIG. 2, the switch board 36 comprises a first end 45, a second end 46, a side edge portion 47, a first surface 48, and a second surface 49 (shown in FIG. 3). The second end 46 is opposite the first end 45. The first surface 48 is opposed to the cover 12. The second surface 49 is the reverse side of the first surface 48.

A pair of switches 51 are provided on the first surface 48 of the switch board 36. The switches 51 are located at positions corresponding to the operation portions 42 of the buttons 22. The switches 51 are pushed by the operation portions 42 and closed thereby when the buttons 22 are depressed into the interior of the main casing 10. In other words, the switches 51 are operated by the buttons 22.

FIG. 4 shows how the internal structure of the cover 12 is in the neighborhood of the buttons 22. As shown in FIG. 4, a connector 52 is mounted on the second surface 49 of the switch board 36. The connector 52 is an example of an electronic component.

A cable is connected to the connector 52. Connected to the connector 52, the cable electrically connects the switch board 36 to other components such as the mother board 26.

Figure 5:
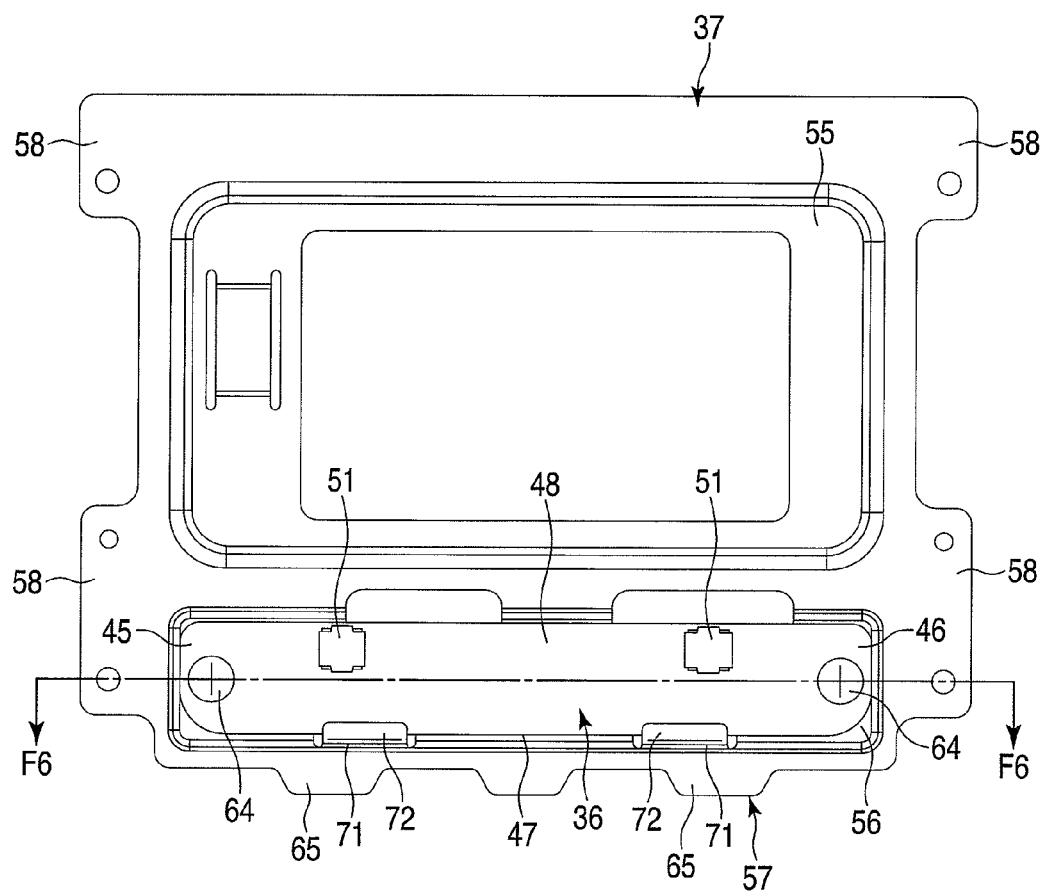
FIG. 5 is an exemplary plan view showing a switch board and a support member depicted in FIG. 2.

FIG. 5 shows the switch board 36 and the support member 37. As shown in FIG. 5, the support member 37 comprises a pad support portion 55, a board support portion 56, a contact portion 57 and a plurality of member-fixing portions 58.

As shown in FIG. 4, the member-fixing portions 58 are provided at positions corresponding to the rightward and leftward ends of the support member 37. The member-fixing portions 58 are secured to the inner surface 14b of the upper wall 14 by means of a plurality of screws 59.

The touch pad 21 is between the pad support portion 55 and the inner surface 14b of the upper wall 14. The pad support portion 55 permits the touch pad 21 to be supported by the cover 12.

As shown in FIG. 2, the board support portion 56 permits the switch board 36 to be supported by the cover 12. As shown in FIG. 4, the board support portion 56 provided with an opening 61. The opening 61 is defined by the edges 37a of the support member 37. The opening 61 is shaped in such a manner as to avoid the connector 52.

The board support portion 56 includes a first support portion 62 and a second support portion 63. The first support portion 62 is a portion configured to support the switch board 36 in the direction from the side wall 15 of the main casing 10. The second support portion 63 is a portion configured to support the switch board 36 in the opposite direction to that of the first support portion 62. In other words, the second support portion 63 is a portion configured to support the switch board 36 from behind.

The area of contact of the first support portion 62 with the switch board 36 is greater than the area of contact of the second support portion 63 with the switch board 36. In other words, the first support portion 62 configured to support the front portion of the switch board 36 supports the switch board 36 with a wider area than the second support portion 63 configured to support the rear portion of the switch board 36.

As shown in FIG. 2, the first end 45 and the second end 46 of the switch board 36 are fixed to the board support portion 56 by means of a pair of fixing screws 64. The fixing screws 64 are an example of fixing members. That is, the fixing screws 64 fix the switch board 36 and the support member 37 together.

As shown in FIG. 2, the contact portion 57 includes a pair of receive portions 65. The receive portions 65 are provided along the side edge portion 47 of the switch board 36 and are projected toward the side wall 15.

As shown in FIG. 3, the upper wall 14 of the cover 12 comprises a projection 66. The projection 66 includes a pair of convex portions 67. The convex portions 67 protrude from the inner surface 14b of the upper wall 14 toward the receive portions 65 of the contact portion 57.

As shown in FIG. 2, the support member 37 includes a pair of engagement portions 71. The engagement portions 71 are integrally formed with the support member 37. As shown in FIG. 3, the engagement portions 71 protrude from the edge 37a, which is near the side wall 15, toward the upper wall 14. In other words, the engagement portions 71 protrude from the front edge 37a.

Each engagement portion 71 includes a claw 72. As shown in FIG. 3, the claw 72 extends from the region near the side wall 15 toward the switch board 36. In cooperation with the support member 37, the claw 72 holds the side edge portion 47 of the switch board 36. In other words, the switch board 36 is held between the claw 72 and the support member 37.

Figure 6:
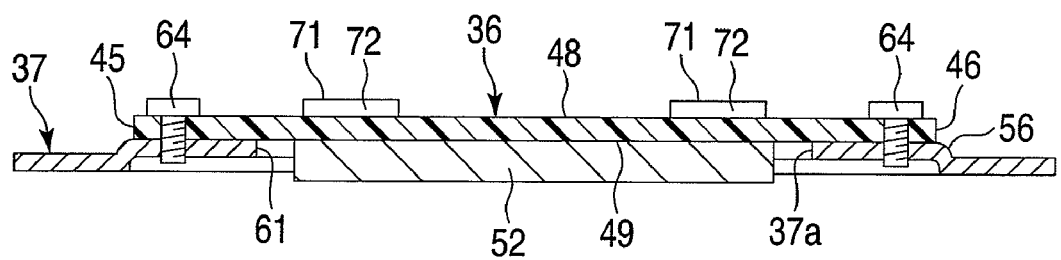
FIG. 6 is an exemplary sectional view taken along line F6-F6 in FIG. 5.

FIG. 6 is a view taken along line F6-F6 in FIG. 5 and illustrates the switch board 36 and the support member 37. As shown in FIG. 6, the claws 72 are located between the paired fixing screws 64 and permit the switch board 36 to be held between the claws 72 and the support member 37.

As shown in FIG. 5, the paired engagement portions 71 are located between the receive portions 65. The claws 72 are located between the paired receive portions 65 and permit the switch board 36 to be held between the claws 72 and the support member 37.

A description will now be given of an operation of the portable computer 1 described above. When the arm rest 18 is depressed externally, the paired convex portions 67 of the projection 66 shown in FIG. 3 are moved down. When the convex portions 67 are moved down, they come into contact with the receive portions 65 of the contact portion 57. When the receive portions 65 are moved down by the convex portions 67, the support member 37 is deformed downward.

Figure 7:
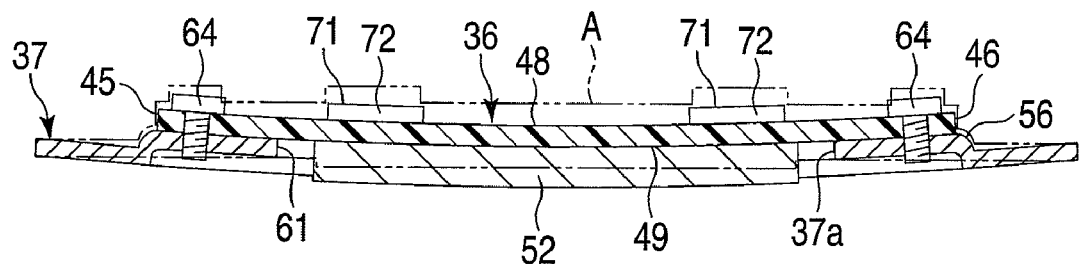
FIG. 7 is an exemplary sectional view showing a state in which the support member depicted in FIG. 6 is deformed.

FIG. 7 shows a state where the support member 37 is deformed. As shown in FIG. 7, when the support member 37 is deformed downward, the switch board 36 pushed by the claws 72 is also deformed. In FIG. 7, position A indicated by the two-dot-dash lines indicates where the switch board 36 and the support member 37 are located before they are deformed.

As described above, when the arm rest 18 is depressed externally, the switch board 36 is also deformed downward. When the arm rest 18 is depressed externally, the operation portions 42 of the buttons 22 are also depressed. However, since the switch board 36 is deformed downward together with the arm rest 18, it moves away from the operation portions 42. Therefore, when the arm rest 18 is depressed, the switch 51 is not undesirably closed, and an undesirable operation is thus prevented.

As shown in FIG. 3, the receive portions 65 protrude toward the side wall 15 located on the front edge of the upper wall 14. The front edge of the upper wall 14 may be easily deformed. Even if the front edge of the arm rest 18 is deformed greatly, the receive portions 65 protruding toward the side wall 15 receive the convex portions 67. With this structure, the support member 37 can be deformed in accordance with the deformation of the arm rest 18, and the switch board 36 can be moved away from the operation portions 42 of the buttons 22.

As shown in FIG. 4, the first support portion 62 configured to support the front portion of the switch board 36 supports the switch board 36 with a wider area than the second support portion 63 configured to support the rear portion of the switch board 36. With this structure, even when the forward end of the arm rest 18 is deformed greatly, the first support portion 62 supports the switch board 36 with a wider area than the second support portion 63. Hence, the over-deforming of the switch board 36 is prevented.

As shown in FIG. 7, when the support member 37 is deformed downward, the switch board 36 is also deformed downward. Because of the mechanical strength of the switch board 36, the support member 37 and the arm rest 18 are not easily deformed. This enhances the mechanical strength of the portable computer 1.

The present invention is not limited to the embodiment described above and may be modified in various manners without departing from the spirit and scope of the present invention. For example, the fixing members need not be the fixing screws described above and may be a double-side adhesive tape or an adhesive agent. Furthermore, the engagement portions need not be the claws described above and may be a beam member provided across the upper surface of the circuit board.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a casing comprising a cover;
an input portion on the cover and configured to receive an external input;
a circuit board contained in the casing and provided with a switch operated by the input portion;
a support member configured to support the circuit board from an opposite side of the cover;
a depressing module configured to depress the support member along with moving the cover; and
an engagement portion integral with the support member, comprising a portion abutting the circuit board, and configured to move the circuit board in response to depression from the depressing module.

2. The electronic device of claim 1, wherein
the support member comprises a contact portion depressed by the depressing module; and
the engagement portion moves the circuit board in a depressed direction in response to depression from the depressing module via the contact portion.

3. The electronic device of claim 2, wherein:
the cover comprises an upper wall on which the input portion is exposed and a side wall;
the contact portion protrudes towards the side wall; and
the depressing module comprises a projection protruding from the upper wall towards the contact portion.

4. The electronic device of claim 2, further comprising:
a pair of fixing members configured to fix the circuit board and the support member,
wherein the circuit board comprises a first end and a second end positioned on an opposite side of the first end, each of the first end and the second end being fixed to the support member by the pair of fixing members, and
the engagement portion abuts the circuit board between the pair of fixing members.

5. The electronic device of claim 2, wherein:
the circuit board comprises a side edge portion;
the contact portion of the support member comprises a pair of receive portions along the side edge portion;
the depressing module comprises a pair of convex portions each protruding toward the pair of receive portions; and
the engagement portion abuts the circuit board between the pair of receive portions.

6. The electronic device of claim 2, wherein:
the circuit board comprises a side edge portion; and
the engagement portion comprises a claw configured to hold the side edge portion in cooperation with the support member.

7. The electronic device of claim 6, wherein:
the cover comprises a side wall;
the claw has a shape extending from a direction of the side wall toward the circuit board.

8. The electronic device of claim 2, wherein:
the circuit board comprises a first surface facing the cover and provided with the switch, and a second surface on an opposite side of the first surface and provided with an electronic component, and
the support member is provided with an opening avoiding the electronic component.

9. The electronic device of claim 8, wherein:
the engagement portion is projected from an edge of the support member which defines the opening.

10. The electronic device of claim 2, wherein:
the cover comprises a side wall;
the support member comprises a first support portion configured to support the circuit board from a direction of the side wall, and a second support portion configured to support the circuit board from an opposite side of the first support portion; and
an area in which the first support portion abuts the circuit board is broader than an area in which the second support portion abuts the circuit board.

11. The electronic device of claim 2, wherein:
the input portion is a click-operation button.

* * * * *